(12) United States Patent
Liu et al.

(10) Patent No.: US 11,808,975 B2
(45) Date of Patent: Nov. 7, 2023

(54) SEMICONDUCTOR STRUCTURE AND FABRICATION METHOD THEREOF

(71) Applicants: Semiconductor Manufacturing International (Shanghai) Corporation, Shanghai (CN); Semiconductor Manufacturing International (Beijing) Corporation, Beijing (CN)

(72) Inventors: Jun Liu, Shanghai (CN); Hong Gang Dai, Shanghai (CN); Dong Xiang Cheng, Shanghai (CN)

(73) Assignees: Semiconductor Manufacturing International (Shanghai) Corporation, Shanghai (CN); Semiconductor Manufacturing International (Beijing) Corporation, Beijing (CN)

( * ) Notice: Subject to any disclaimer, the term of this patent is extended or adjusted under 35 U.S.C. 154(b) by 0 days.

(21) Appl. No.: 17/646,125

(22) Filed: Dec. 27, 2021

(65) Prior Publication Data
US 2022/0206217 A1   Jun. 30, 2022

(30) Foreign Application Priority Data
Dec. 28, 2020  (CN) .................. 202011587896.X

(51) Int. Cl.
*G02B 6/12* (2006.01)
*G02B 6/10* (2006.01)
*G02B 6/122* (2006.01)
*G02B 6/136* (2006.01)

(52) U.S. Cl.
CPC .............. *G02B 6/122* (2013.01); *G02B 6/136* (2013.01); *G02B 2006/12061* (2013.01)

(58) Field of Classification Search
CPC ................... G02B 6/122; G02B 6/136; G02B 2006/12061; G02B 6/1223; G02B 6/132
USPC ...................................... 385/130, 14
See application file for complete search history.

(56) References Cited

U.S. PATENT DOCUMENTS

| | | | |
|---|---|---|---|
| 6,642,913 B1 | 11/2003 | Kimura et al. | |
| 10,156,676 B1* | 12/2018 | Shank | H01L 31/1136 |
| 2022/0244583 A1* | 8/2022 | Liang | G02F 1/0027 |

FOREIGN PATENT DOCUMENTS

CN   104900501 A   9/2015

* cited by examiner

*Primary Examiner* — Kaveh C Kianni
*Assistant Examiner* — Hung Q Lam
(74) *Attorney, Agent, or Firm* — Anova Law Group, PLLC

(57) ABSTRACT

A semiconductor structure and a fabrication method are provided. The semiconductor structure includes: a base substrate, an optical waveguide layer over the base substrate; a first dielectric layer over the base substrate; a cavity between the first dielectric layer and the optical waveguide layer; and a second dielectric layer on the first dielectric layer and the optical waveguide layer. The cavity is located on sidewall surfaces of the optical waveguide layer and has a bottom coplanar with a bottom of the optical waveguide layer. The second dielectric layer is located on a top of the cavity and seals the cavity.

20 Claims, 4 Drawing Sheets

SEMICONDUCTOR STRUCTURE AND FABRICATION METHOD THEREOF

CROSS-REFERENCES TO RELATED APPLICATION

This application claims the priority of Chinese Patent Application No. 202011587896.X, filed on Dec. 28, 2020, the content of which is incorporated herein by reference in its entirety.

TECHNICAL FIELD

The present disclosure generally relates to the field of semiconductor fabrication technology and, more particularly, relates to a semiconductor structure and its fabrication method.

BACKGROUND

Silicon photonics technology is a low-cost, high-speed optical communication technology based on silicon photonics. Based on silicon-based substrate materials, laser beams are used to replace electronic information to transmit data by using CMOS technology to combine integrated circuits represented by microelectronics and photonic technology.

An optical wave guide is a guide structure composed of an optically transparent medium (such as quartz glass) that transmits optical-frequency electromagnetic waves. The transmission principle of the optical waveguide is that the total reflection of electromagnetic waves on an interface of media with different refractive indexes causes light waves to be limited and propagate in the wave guide and a limited area around it.

Among many optical wave guide materials used in the communication band, a silicon-on-insulator material is easy to produce sub-micron-level low-loss optical wave guides due to its strong light confinement ability, and the manufacturing process is compatible with the manufacturing process of microelectronic integrated circuits. It greatly reduces the cost of preparing optoelectronic chips, making it one of the most competitive materials for realizing high-density optoelectronic integrated chips.

However, the performance of semiconductor structures formed by using silicon-on-insulator materials in the existing technologies is still poor.

SUMMARY

One aspect of the present disclosure provides a semiconductor structure. The semiconductor structure includes: a base substrate, an optical waveguide layer over the base substrate; a first dielectric layer over the base substrate where a cavity is formed between the first dielectric layer and the optical waveguide layer; and a second dielectric layer on the first dielectric layer and the optical waveguide layer. The cavity is located on sidewall surfaces of the optical waveguide layer and has a bottom coplanar with a bottom of the optical waveguide layer. The second dielectric layer is located on a top of the cavity and seals the cavity.

Optionally, the optical waveguide layer is made of a material with a first refractive index. The cavity has a second refractive index. The second refractive index is less than the first refractive index, and is also less than the refractive index of silicon dioxide.

Optionally, the optical waveguide layer is made of a semiconductor material including silicon or $SiN_x$.

Optionally, a size of the cavity along a direction perpendicular to sidewalls of the cavity is about 10 nm to about 200 nm.

Optionally, a size of a top of the cavity is less than a size of a bottom of the cavity along a direction perpendicular to sidewalls of the cavity.

Optionally, the cavity is filled with air.

Optionally, the base substrate includes a substrate and an insulation layer on the substrate.

Optionally, the substrate is made of a semiconductor material including silicon or silicon germanium.

Optionally, the insulation layer is made of $SiO_x$, $SiN_x$, SiNC, SiNB, SiNCO, SiNO, or a combination thereof.

Optionally, the first dielectric layer is made of $SiO_x$, $SiN_x$, SiNC, SiNB, SiNCO, SiNO, or a combination thereof.

Optionally, the second dielectric layer is made of $SiO_x$, $SiN_x$, SiNC, SiNB, SiNCO, SiNO, or a combination thereof.

Another aspect of the present disclosure provides a fabrication method for forming a semiconductor structure. The method includes: providing a base substrate with an optical waveguide layer over the base substrate; forming a sacrificial layer on sidewall surfaces of the optical waveguide layer; forming a first dielectric layer over the base substrate, to expose a top surface of the sacrificial layer; removing the sacrificial layer to form a cavity between the first dielectric layer and the optical waveguide layer; and forming a second dielectric layer on the first dielectric layer and the optical waveguide layer. The optical waveguide layer is made of a material with a first refractive index. The cavity has a second refractive index. The second refractive index is less than the first refractive index, and is also less than the refractive index of silicon dioxide. The second dielectric layer is located on a top of the cavity and seals the cavity.

Optionally, before forming the sacrificial layer, the method further includes: forming a protection layer on a top surface of the optical waveguide layer.

Optionally, the protection layer and the sacrificial layer are made of a same material. The protection layer is made of $SiO_x$, $SiN_x$, SiNC, SiNB, SiNCO, SiNO, or a combination thereof.

Optionally, the sacrificial layer is formed by: forming a sacrificial material layer on the surface of the base substrate, on a top of the optical waveguide layer, and on the sidewall surfaces of the optical waveguide layer; and etching back the sacrificial material layer until exposing the surface of the base substrate and the top surface of the optical waveguide layer, to form the sacrificial layer on the sidewall surfaces of the optical waveguide layer.

Optionally, the first dielectric layer is formed by: forming a dielectric material layer over the base substrate and the protection layer, wherein the dielectric material layer covers a surface of the sacrificial layer; and planarizing the dielectric material layer until exposing the top surface of the sacrificial layer and the top surface of the protection layer, to form the first dielectric layer.

Optionally, the second dielectric layer is formed by a plasma-enhanced chemical vapor deposition method.

Optionally, after forming the first dielectric layer and before forming the second dielectric layer, the method further includes: removing the protection layer.

Optionally, the base substrate includes a substrate and an insulation layer on a surface of the substrate.

Optionally, the base substrate and the optical waveguide layer are formed by: providing a silicon-on-insulator substrate including a first substrate, an initial insulation layer on a surface of the first substrate, and a second substrate on a surface of the initial insulation layer; and patterning the second substrate of the silicon-on-insulator substrate until exposing the surface of the initial insulation layer, to form the base substrate and the optical waveguide layer over the base substrate.

In the present disclosure, by removing the sacrificial layer, the cavity may be formed between the optical waveguide layer and the first dielectric layer. The cavity may have a second refractive index and the optical waveguide layer may have a first refractive index. The second refractive index may be less than the first refractive index and less than the refractive index of silicon dioxide. A magnitude by which the first refractive index of the optical waveguide layer material is larger than the second refractive index of the cavity may be large. Correspondingly, during the transmission process of the light wave in the optical waveguide layer, total reflection may better occur, thereby improving the light wave transmission efficiency in the optical waveguide layer. The performance of the semiconductor structure may be improved.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

It should be noted that "surface" or "upper" in this specification are used to describe the relative positional relationship in space, and are not limited to whether they are in direct contact.

Figure 1:
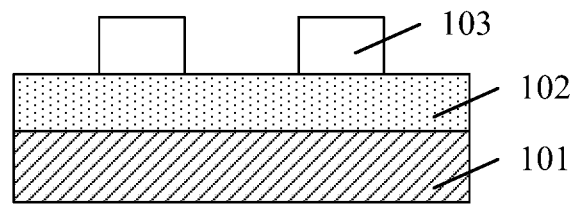
FIGS. 1-3 illustrate semiconductor structures corresponding to certain stages for forming a semiconductor structure.
Figure 2:
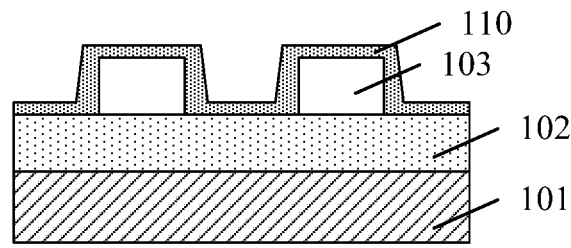
Figure 3:
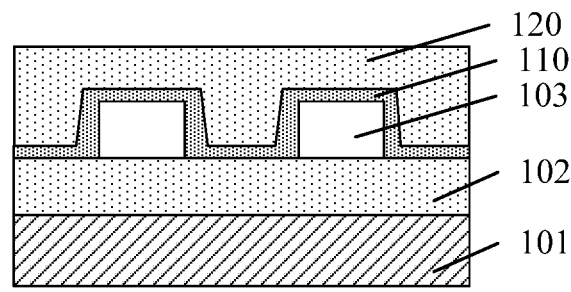

FIGS. 1-3 illustrate semiconductor structures corresponding to certain stages for forming a semiconductor structure.

As shown in FIG. 1, a base substrate 100 is provided. The base substrate 100 includes a substrate 101 and an insulation layer 102 on a surface of the substrate 101. An optical waveguide layer 103 is formed over the base substrate 100.

As shown in FIG. 2, a sidewall layer 110 is formed on a top surface of the optical waveguide layer 103, side surfaces of the optical waveguide layer 103, and a surface of the base substrate 100.

As shown in FIG. 3, a dielectric layer 120 is formed on a surface of the sidewall layer 110.

In the above structure, a refractive index of a material of the optical waveguide layer 103 is larger than a refractive index of the sidewall layer 110, such that the light is totally reflected in the optical waveguide layer 103 and is confined in the optical waveguide 103 for transmission.

However, usually, the optical waveguide layer 103 is made of single crystal silicon, and the refractive index of the single crystal silicon material is 3.4. The sidewall layer 110 is made of silicon dioxide, and the refractive index of silicon dioxide is 1.45. Since the refractive index difference between single crystal silicon and silicon dioxide is small, some light is still prone to refraction, such that the loss of light waves during the transmission of light in the optical waveguide layer 103 is still large. The performance of the semiconductor structure is poor.

The present disclosure provides a semiconductor structure and its fabrication method to at least partially alleviate the above problems. In the present disclosure, by removing a sacrificial layer, a cavity may be formed between an optical waveguide layer and a first dielectric layer. The cavity may have a second refractive index and the optical waveguide layer may have a first refractive index. The second refractive index may be less than the first refractive index and less than the refractive index of silicon dioxide. A magnitude by which the first refractive index of the optical waveguide layer material is larger than the second refractive index of the cavity may be large. Correspondingly, during the transmission process of the light wave in the optical waveguide layer, total reflection may better occur, thereby improving the light wave transmission efficiency in the optical waveguide layer. The performance of the semiconductor structure may be improved.

One embodiment of the present disclosure provides a fabrication method of a semiconductor structure. FIGS. 4-10 illustrate semiconductor structures corresponding to certain stages of forming an exemplary semiconductor structure, and FIG. 11 illustrates an exemplary method for forming a semiconductor structure.

Figure 4:
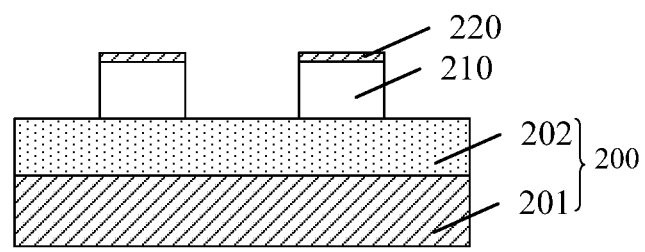
FIGS. 4-10 illustrate semiconductor structures corresponding to certain stages of forming an exemplary semiconductor structure according to various disclosed embodiments of the present disclosure.
Figure 11:
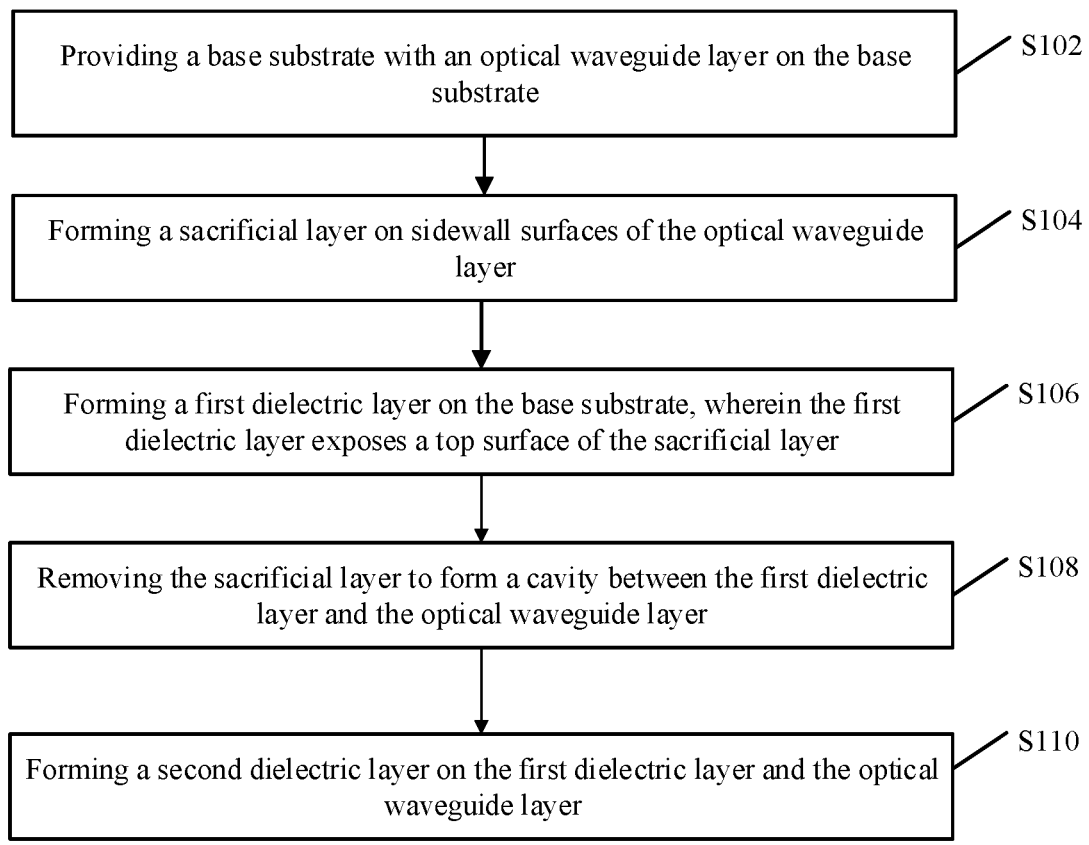
FIG. 11 illustrates an exemplary method for forming a semiconductor structure according to various disclosed embodiments of the present disclosure.

As illustrated in FIG. 4, a base substrate 200 may be provided and an optical waveguide layer 210 may be disposed over the base substrate 200 (e.g., S102 in FIG. 11). A material of the optical waveguide layer 210 may have a first refractive index.

In one embodiment, the base substrate 200 may include a substrate 201 and an insulation layer 202 on a surface of the substrate 201. The optical waveguide layer 210 may be disposed on a portion of a surface of the insulation layer 202.

The substrate 201 may be made of a semiconductor material including silicon, silicon germanium, or a combination thereof. In one embodiment, the substrate 201 may be made of silicon.

The insulation layer 202 may be made of $SiO_x$, $SiN_x$, SiNC, SiNB, SiNCO, SiNO, or a combination of. In one embodiment, the insulation layer 202 may be made of $SiO_x$.

The base substrate 200 and the optical waveguide layer 210 may be formed by: providing a silicon-on-insulator substrate (not shown in the figures) including a first substrate, an initial insulation layer on a surface of the first substrate, and a second substrate on a surface of the initial insulation layer; and patterning the second substrate of the silicon-on-insulator substrate until exposing the surface of the initial insulation layer, to form the base substrate 200 and the optical waveguide layer 210 over the base substrate 200.

Specifically, the process of patterning the second substrate of the silicon-on-insulator substrate may be used to form the optical waveguide layer 210 in the second substrate, to form the substrate 201 from the first substrate, and to form the insulation layer 202 from the initial insulation layer.

In one embodiment, a protection layer 220 may be disposed on a top surface of the optical waveguide layer 210. The protection layer 220 may be used to protect the top surface of the optical waveguide layer 210, and reduce the damage of the surface of the second substrate during the process of forming the optical waveguide layer 210 by the patterning process and subsequent manufacturing process, therefore improving the performance of the optical waveguide layer.

The protection layer 220 may be formed by: forming a protective material layer (not shown in the figure) on the surface of the silicon-on-insulator substrate; and patterning the protective material layer to form the protection layer 220 on the top surface of the optical waveguide layer 210.

Specifically, in the process of patterning the second substrate in the silicon-on-insulator substrate, the protective material layer may be also patterned to form the optical waveguide layer 210 and the protection layer 220 on the top surface of the optical waveguide layer 210.

The protection layer 220 may be made of a material same as a material of a subsequent sacrificial layer. Correspondingly, the protection layer 220 may be removed simultaneously in a process for removing the sacrificial layer subsequently. Steps of the process may be reduced and the time of the process may be saved.

The protection layer 220 may be made of $SiO_x$, $SiN_x$, SiNC, SiNB, SiNCO, SiNO, or a combination thereof. In one embodiment, the protection layer 220 may be made of $SiN_x$.

Figure 5:
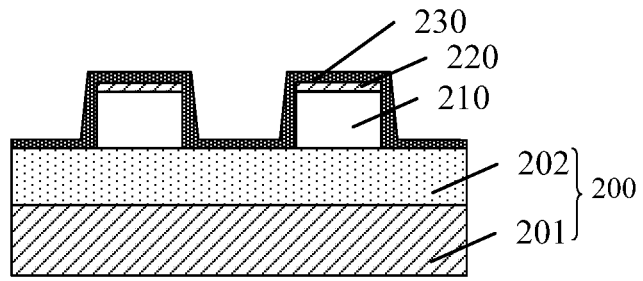
Figure 6:
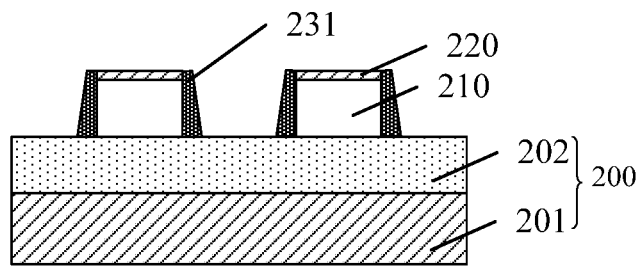

Subsequently, a sacrificial layer may be formed on sidewall surfaces of the optical waveguide layer 210, as shown in FIG. 5 and FIG. 6 (e.g., S104 in FIG. 11).

As shown in FIG. 5, a sacrificial material layer 230 may be formed on the surface of the base substrate 200, on a top of the optical waveguide layer 210, and on the sidewall surfaces of the optical waveguide layer 210.

The sacrificial material layer 230 may provide a material layer for forming the sacrificial layer.

In one embodiment, the sacrificial material layer 230 may be formed on the surface of the base substrate 200, on a top surface of the protection layer 220, on sidewall surfaces of the protection layer 220, and on the sidewall surfaces of the optical waveguide layer 210.

The sacrificial material layer 230 may be made of $SiO_x$, $SiN_x$, SiNC, SiNB, SiNCO, SiNO, or a combination thereof.

In one embodiment, the sacrificial material layer 230 may be made of a material same as the protection layer 220, that is, $SiN_x$.

In some other embodiments, the sacrificial material layer 230 may be made of a material different from the material of the protection layer 220.

As shown in FIG. 6, the sacrificial material layer 230 may be etched back, until exposing the surface of the base substrate 200 and the top surface of the optical waveguide layer 210, to form the sacrificial layer 231 on the sidewall surfaces of the optical waveguide layer 210.

The sacrificial layer 231 may be used to occupy a space for subsequently forming a cavity.

In one embodiment, the protection layer 220 may be disposed on the top surface of the optical waveguide layer 210. The sacrificial material layer 230 may be etched back, until exposing the surface of the base substrate 200 and the top surface of the protection layer 220 on the top surface of the optical waveguide layer 210.

The sacrificial layer 231 may be formed by etching back the sacrificial material layer 230. Correspondingly, the sacrificial layer 231 may be made of $SiO_x$, $SiN_x$, SiNC, SiNB, SiNCO, SiNO, or a combination thereof. In one embodiment, the sacrificial layer 231 may be made of $SiN_x$.

Figure 7:
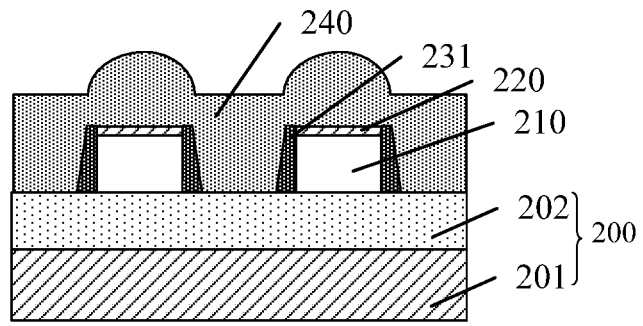
Figure 8:
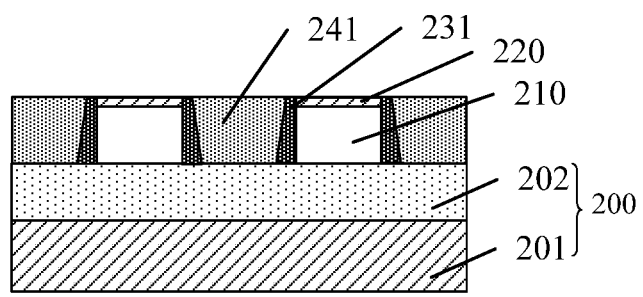

Subsequently, a first dielectric layer may be formed over the base substrate 200, and the first dielectric layer may expose a top surface of the sacrificial layer 231, as shown in FIG. 7 and FIG. 8 (e.g., S106 in FIG. 11).

As illustrated in FIG. 7, a dielectric material layer 240 may be formed over the base substrate 200. The dielectric layer 240 may cover the surface of the sacrificial layer 231.

In one embodiment, the dielectric material layer 240 may be formed over the base substrate 200 and the protection layer 230.

The dielectric material layer 240 may be made of a material different from a material of the sacrificial layer 231. Correspondingly, the first dielectric layer formed subsequently may be made of a material different from a material of the sacrificial layer 231.

The dielectric material layer 240 may be made of $SiO_x$, $SiN_x$, SiNC, SiNB, SiNCO, SiNO, or a combination thereof. In one embodiment, the dielectric material layer 240 may be made of $SiO_x$.

As illustrated in FIG. 8, the dielectric material layer 240 may be planarized until exposing the top surface of the sacrificial layer 231 and the top surface of the optical waveguide layer 210, to form the first dielectric layer 241.

In one embodiment, the protection layer 220 may be disposed on the top surface of the optical waveguide layer 210. Correspondingly, the dielectric material layer 240 may be planarized until exposing the top surface of the protection layer on the top surface of the optical waveguide layer 210, to form the first dielectric layer 241.

The first dielectric layer 241 may be formed from the dielectric material layer 240. Correspondingly, the first dielectric layer 241 may be made a material different from the sacrificial layer 231. The first dielectric layer 241 may be made of $SiO_x$, $SiN_x$, SiNC, SiNB, SiNCO, SiNO, or a combination thereof. In one embodiment, the first dielectric layer 241 may be made of $SiO_x$.

Figure 9:
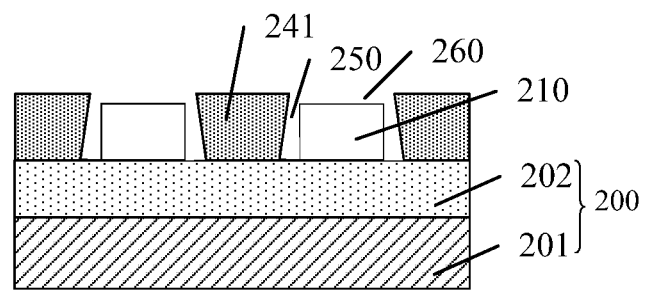

As shown in FIG. 9, the sacrificial layer 231 may be removed to form a cavity 250 between the first dielectric layer 241 and the optical waveguide layer 210 (e.g., S108 in FIG. 11). The cavity 250 may have a second refractive index. The second refractive index may be less than the first refractive index and less than the refractive index of the $SiO_x$.

In one embodiment, the cavity 250 may contain air, and the refractive index of the cavity 250 may be 1.

A size of the cavity 250 along a direction perpendicular to sidewalls of the cavity 250 may be about 10 nm to about 200 nm.

In one embodiment, a size of a top of the cavity 250 may be less than a size of a bottom of the cavity 250. The size may be the size of the top of the cavity 250.

The sacrificial layer 231 may be formed on the sidewalls of the optical waveguide layer 210, and the sacrificial layer 231 may occupy a certain space. Subsequently, the sacrificial layer 231 may be removed, and the cavity 250 may be formed in the first dielectric layer 241. The material of the optical waveguide layer 210 may have the first refractive index and the cavity 250 may have the second refractive index. The second refractive index may be not only less than the first refractive index, but also less than the refractive index of silicon dioxide. That is, a magnitude by which the first refractive index of the optical waveguide 210 is larger than the second refractive index of the cavity 250 may be large, such that the light may be totally reflected during the transmission process in the optical waveguide layer 210, thereby improving the transmission efficiency of light waves in the optical waveguide layer. The performance of the semiconductor structure may be improved.

In one embodiment, the protection layer 220 may be disposed on the top surface of the optical waveguide layer 210. The method may further include: removing the protection layer 220 to form a groove 260 in the first dielectric layer 241 on the top of the optical waveguide layer 210, after forming the first dielectric layer 241 and before forming a second dielectric layer.

In one embodiment, the sacrificial layer 231 may be made of a material same as the protection layer 220. Correspondingly, when removing the sacrificial layer 231, the protection layer 220 may be removed effectively, to reduce the steps of the process.

The protection layer 220 may be made of $SiN_x$. The refractive index of $SiN_x$ may be larger than the refractive index of the second dielectric layer formed subsequently. By removing the protection layer 220 to form the groove 260, the groove 260 may be filled up with the second dielectric layer formed subsequently. That is, the protection layer 220 may be replaced by the second dielectric layer with a less refractive index formed subsequently, which may be beneficial to the total reflection of the light occurred in the optical waveguide layer 210. The transmission efficiency of light waves in the optical waveguide layer 210 may be improved.

Figure 10:
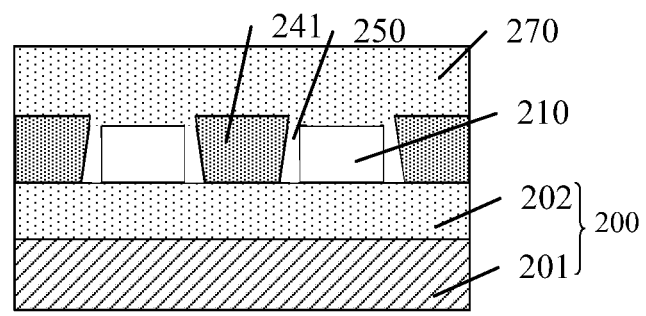

As shown in FIG. 10, a second dielectric layer 270 may be formed on the first dielectric layer 241 and on the optical waveguide layer 210 (e.g., S110 in FIG. 11). The second dielectric layer 270 may be located on the top of the cavity 250 and seal the cavity 250.

In one embodiment, the second dielectric layer 270 may further fill up the groove 260 on the top of the optical waveguide layer 210 (shown in FIG. 9).

The second dielectric layer 270 may be made of $SiO_x$, $SiN_x$, SiNC, SiNB, SiNCO, SiNO, or a combination thereof. In one embodiment, the second dielectric layer 270 may be made of $SiO_x$.

The second dielectric layer 270 may be formed by a plasma-enhanced chemical vapor deposition method.

By using the plasma-enhanced chemical vapor deposition method to form the second dielectric layer 270, when the size of the cavity 250 is small, the formed second dielectric layer 270 may be not easy to fill in the cavity 250. Correspondingly, the second dielectric layer 270 may be deposited on the top surface of the cavity 250 effectively, ensuring that the cavity 250 has a small refractive index. Correspondingly, total reflection of the light may be occurred effectively during the transmission process of the light in the optical waveguide layer 210, thereby improving the transmission efficiency of light waves in the optical waveguide layer 210 and the performance of the semiconductor structure.

The present disclosure also provides a semiconductor structure. In one embodiment shown in FIG. 10, the semiconductor structure may include: a base substrate 200; an optical waveguide layer 210 over the base substrate 200; a first dielectric layer 241 over the base substrate 200; a cavity 250 between the first dielectric layer 241 and the optical waveguide layer 210; and a second dielectric layer 270 on the first dielectric layer 241 and the optical waveguide layer 210. The cavity 250 may be located on sidewall surfaces of the optical waveguide layer 210, and have a bottom coplanar with a bottom of the optical waveguide layer 210. The second dielectric layer 270 may be located on a top of the cavity 250 and seal the cavity 250.

The cavity 250 may be located between the first dielectric layer 241 and the optical waveguide layer 210, and may be located on the sidewall surfaces of the optical waveguide layer 210. The cavity on the sidewall surfaces of the optical waveguide layer 210 may have a small refractive index, such that total reflection of the light may be occurred effectively during the transmission process of the light in the optical waveguide layer 210, thereby improving the transmission efficiency of light waves in the optical waveguide layer 210 and the performance of the semiconductor structure.

The optical waveguide layer 210 may be made of a material with a first refractive index and the cavity 250 may have a second refractive index. The second refractive index may be less than the first refractive index, and the second refractive index may be also less than the refractive index of silicon dioxide.

The optical waveguide layer 210 may be made of a semiconductor material including silicon or silicon germanium. In one embodiment, the optical waveguide layer 210 may be made of silicon, and the optical waveguide layer 210 may have the first refractive index of 3.4.

The optical waveguide layer 210 may have the first refractive index, and the cavity 250 may have the second refractive index. The second refractive index may be not only less than the first refractive index, but also less than the refractive index of silicon dioxide. The first refractive index of the optical waveguide layer 210 may be larger than the second refractive index of the cavity 250, such that the light may be totally reflected during the transmission process in the optical waveguide layer 210, therefore improving the transmission efficiency of light waves in the optical waveguide layer 210 and the performance of the semiconductor structure.

The refractive index of silicon dioxide may be 1.45.

A size of the cavity 250 along a direction perpendicular to sidewalls of the cavity 250 may be about 10 nm to about 200 nm.

When the size of the cavity 250 is smaller than 10 nm, a volume of the cavity may be too small, and the function of the cavity 250 may be compromised such that the light may not be totally reflected in the optical waveguide layer 210. When the size is larger than 200 nm, it may be difficult to form the cavity 250 or a material of the second dielectric layer 270 formed subsequently may be easy to enter the cavity 250 to affect the difference between the refractive indexes of the optical waveguide layer 210 and the cavity 250. The loss during the light transmission may be still large.

In one embodiment, a size of a top of the cavity 250 may be smaller than a size of a bottom of the cavity 250.

The cavity 250 may be filled with air.

The second refractive index of the cavity 250 may be 1.

The base substrate 200 may include a substrate 201 and an insulation layer 202 on a surface of the substrate 201. The optical waveguide layer 210 may be disposed on a portion of a surface of the insulation layer 202.

The substrate 201 may be made of a semiconductor material including silicon, silicon germanium, or a combination thereof. In one embodiment, the substrate 201 may be made of silicon.

The first dielectric layer 241 may be made of $SiO_x$, $SiN_x$, SiNC, SiNB, SiNCO, SiNO, or a combination thereof. In one embodiment, the first dielectric layer 241 may be made of $SiO_x$.

The second dielectric layer 270 may be made of $SiO_x$, $SiN_x$, SiNC, SiNB, SiNCO, SiNO, or a combination thereof. In one embodiment, the second dielectric layer 270 may be made of $SiO_x$.

In the present disclosure, by removing the sacrificial layer, the cavity may be formed between the optical waveguide layer and the first dielectric layer. The cavity may have a second refractive index and the optical waveguide layer may have a first refractive index. The second refractive index may be less than the first refractive index and less than the refractive index of silicon dioxide. A magnitude by which the first refractive index of the optical waveguide layer material is larger than the second refractive index of the cavity may be large. Correspondingly, during the transmission process of the light wave in the optical waveguide layer, total reflection may better occur, thereby improving the light wave transmission efficiency in the optical waveguide layer. The performance of the semiconductor structure may be improved.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A semiconductor structure, comprising:
a base substrate;
an optical waveguide layer over the base substrate;
a first dielectric layer over the base substrate, wherein a cavity is formed between the first dielectric layer and the optical waveguide layer, and the cavity is located on sidewall surfaces of the optical waveguide layer and has a bottom coplanar with a bottom of the optical waveguide layer, and the cavity is filled with air; and
a second dielectric layer on the first dielectric layer and the optical waveguide layer, wherein the second dielectric layer is located on a top of the cavity and seals the cavity.

2. The structure according to claim 1, wherein:
the optical waveguide layer is made of a material with a first refractive index;
the cavity has a second refractive index; and
the second refractive index is less than the first refractive index, and is also less than a refractive index of silicon dioxide.

3. The structure according to claim 2, wherein:
the optical waveguide layer is made of a semiconductor material including silicon or $SiN_x$.

4. The structure according to claim 1, wherein:
a size of the cavity along a direction perpendicular to sidewalls of the cavity is about 10 nm to about 200 nm.

5. The structure according to claim 1, wherein:
a size of a top of the cavity is smaller than a size of a bottom of the cavity along a direction perpendicular to sidewalls of the cavity.

6. The structure according to claim 1, wherein the base substrate includes a substrate and an insulation layer on the substrate.

7. The structure according to claim 6, wherein the substrate is made of a semiconductor material including silicon, silicon germanium, or a combination thereof.

8. The structure according to claim 6, wherein the insulation layer is made of $SiO_x$, $SiN_x$, SiNC, SiNB, SiNCO, SiNO, or a combination thereof.

9. The structure according to claim 1, wherein the first dielectric layer is made of $SiO_x$, $SiN_x$, SiNC, SiNB, SiNCO, SiNO, or a combination thereof.

10. The structure according to claim 1, wherein the second dielectric layer is made of $SiO_x$, $SiN_x$, SiNC, SiNB, SiNCO, SiNO, or a combination thereof.

11. A fabrication method of a semiconductor structure, comprising:
providing a base substrate with an optical waveguide layer over the base substrate, wherein the optical waveguide layer is made of a material with a first refractive index;
forming a sacrificial layer on sidewall surfaces of the optical waveguide layer;
forming a first dielectric layer over the base substrate, wherein the first dielectric layer exposes a top surface of the sacrificial layer;
removing the sacrificial layer to form a cavity between the first dielectric layer and the optical waveguide layer; and
forming a second dielectric layer on the first dielectric layer and the optical waveguide layer,
wherein:
the cavity has a second refractive index, and the cavity is filled with air;
the second refractive index is less than the first refractive index, and is also less than the refractive index of silicon dioxide; and
the second dielectric layer is located on a top of the cavity and seals the cavity.

12. The method according to claim 11, before forming the sacrificial layer, further including:
forming a protection layer on a top surface of the optical waveguide layer.

13. The method according to claim 12, wherein:
the protection layer and the sacrificial layer are made of a same material; and
the protection layer is made of $SiO_x$, $SiN_x$, SiNC, SiNB, SiNCO, SiNO, or a combination thereof.

14. The method according to claim 11, wherein the sacrificial layer is formed by:
forming a sacrificial material layer on the surface of the base substrate, on a top of the optical waveguide layer, and on the sidewall surfaces of the optical waveguide layer; and
etching back the sacrificial material layer until exposing the surface of the base substrate and the top surface of the optical waveguide layer, to form the sacrificial layer on the sidewall surfaces of the optical waveguide layer.

15. The method according to claim 13, wherein the first dielectric layer is formed by:
forming a dielectric material layer over the base substrate and the protection layer, wherein the dielectric material layer covers a surface of the sacrificial layer; and
planarizing the dielectric material layer until exposing the top surface of the sacrificial layer and the top surface of the protection layer, to form the first dielectric layer.

16. The method according to claim 11, wherein:
the second dielectric layer is formed by a plasma-enhanced chemical vapor deposition method.

17. The method according to claim 12, after forming the first dielectric layer and before forming the second dielectric layer, further including:
removing the protection layer.

18. The method according to claim 11, wherein:
the base substrate includes a substrate and an insulation layer on a surface of the substrate.

19. The method according to claim 18, wherein the base substrate and the optical waveguide layer are formed by:
providing a silicon-on-insulator substrate, wherein the silicon-on-insulator substrate includes a first substrate, an initial insulation layer on a surface of the first substrate, and a second substrate on a surface of the initial insulation layer; and
patterning the second substrate of the silicon-on-insulator substrate until exposing the surface of the initial insulation layer, to form the base substrate and the optical waveguide layer over the base substrate.

20. The structure according to claim 1, wherein:
a bottom surface of the first dielectric layer is coplanar with a bottom surface of the optical waveguide layer;

a top surface of the first dielectric layer is higher than a top surface of the optical waveguide layer; and a size of the top surface of the first dielectric layer is larger than a size of the bottom surface of the first dielectric layer.

\* \* \* \* \*